(12) United States Patent
Borgmann et al.

(10) Patent No.: US 10,744,667 B2
(45) Date of Patent: Aug. 18, 2020

(54) SEED POTATO CUTTING SYSTEM WITH BLADE POSITIONING MECHANISM

(71) Applicants: Rainer Borgmann, Idaho Falls, ID (US); Evan Steel, Shelley, ID (US)

(72) Inventors: Rainer Borgmann, Idaho Falls, ID (US); Evan Steel, Shelley, ID (US)

(73) Assignee: Spudnik Equipment Company LLC, Blackfoot, ID (US)

( * ) Notice: Subject to any disclaimer, the term of this patent is extended or adjusted under 35 U.S.C. 154(b) by 146 days.

(21) Appl. No.: 15/407,196

(22) Filed: Jan. 16, 2017

(65) Prior Publication Data

US 2018/0200911 A1 Jul. 19, 2018

(51) Int. Cl.
*B26D 7/26* (2006.01)
*B26D 7/06* (2006.01)
*B26D 7/18* (2006.01)
*B26D 1/15* (2006.01)
*A01C 1/00* (2006.01)

(52) U.S. Cl.
CPC ............ *B26D 7/2635* (2013.01); *A01C 1/005* (2013.01); *B26D 1/15* (2013.01); *B26D 7/0625* (2013.01); *B26D 7/0641* (2013.01); *B26D 7/18* (2013.01); *B26D 2210/02* (2013.01)

(58) Field of Classification Search
CPC .. B26D 7/2635; B26D 7/2653; B26D 7/0641; B26D 7/18; B26D 2210/02; B26D 1/15; A01C 1/005; B23Q 7/035; B23Q 7/03; Y10T 83/2192; Y10T 83/6571; Y10T 83/6582; Y10T 83/6584
See application file for complete search history.

(56) References Cited

U.S. PATENT DOCUMENTS

| | | | |
|---|---|---|---|
| 1,438,496 A * | 12/1922 | Johnson | A01C 1/005 83/212.1 |
| 1,745,001 A * | 1/1930 | Bates | 83/409.1 |
| 1,784,718 A | 12/1930 | Bergren et al. | |
| 2,956,601 A | 10/1960 | Fry | |
| 3,096,801 A * | 7/1963 | Miles | 83/404.2 |
| 3,195,596 A * | 7/1965 | Peterson | 99/514 |
| 3,195,597 A | 7/1965 | Peterson | |
| 3,367,494 A | 2/1968 | Peterson | |
| 4,231,464 A | 11/1980 | Neilson | |
| 4,570,518 A * | 2/1986 | Burmeister | B26D 1/225 83/504 |
| 5,551,327 A * | 9/1996 | Hamby | B27B 5/34 83/425.4 |
| 5,946,995 A * | 9/1999 | Michell | B23D 59/008 144/3.1 |

(Continued)

*Primary Examiner* — Kenneth E Peterson
*Assistant Examiner* — Fernando A Ayala
(74) *Attorney, Agent, or Firm* — Progress Patent Law, PLLC; David R. McKinney

(57) ABSTRACT

A seed potato cutting system includes a cutting roller unit with an endless roller chain, having a plurality of parallel roller sets, each roller set including a plurality of cylindrical rollers on a common axle, with lateral gaps between adjacent rollers, configured to convey seed potatoes toward a distal end of the roller chain. A plurality of pairs of parallel upright blades are disposed at the distal end, the blades having common rotational axes and a cutting edge that passes within a lateral gap between rollers, each pair of blades having a common adjustable blade gap therebetween.

19 Claims, 9 Drawing Sheets

(56) References Cited

U.S. PATENT DOCUMENTS

| | | | |
|---|---|---|---|
| 6,375,565 B1 | 4/2002 | Tanner et al. | |
| 6,418,823 B1* | 7/2002 | Taitler | B26D 1/08 |
| | | | 83/100 |
| 8,156,851 B2 | 4/2012 | Julian et al. | |
| 8,869,668 B1* | 10/2014 | Hotek | 83/425.4 |
| 2015/0151331 A1 | 6/2015 | Peterson et al. | |
| 2016/0052154 A1* | 2/2016 | Goins | 30/307 |

\* cited by examiner

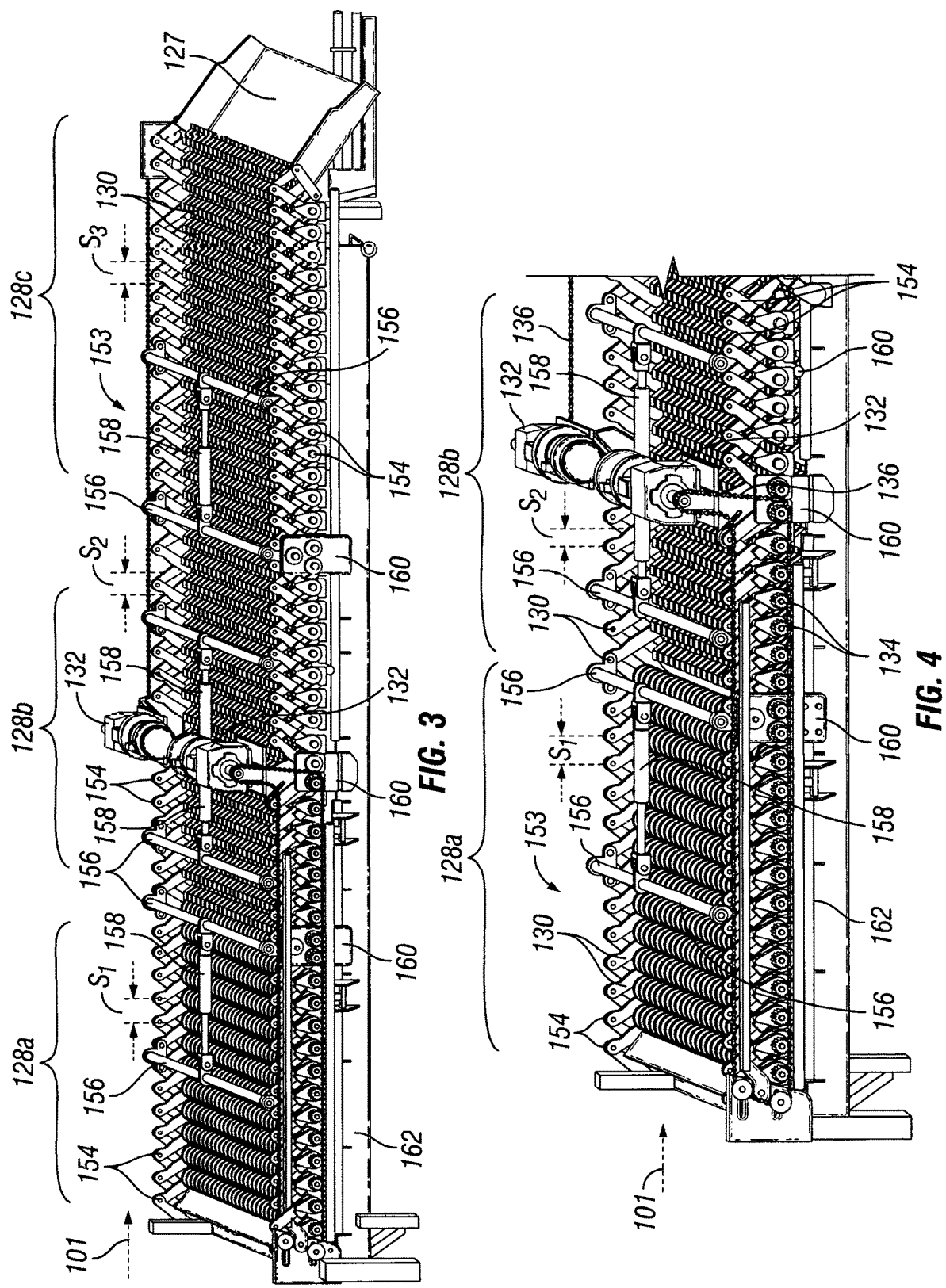

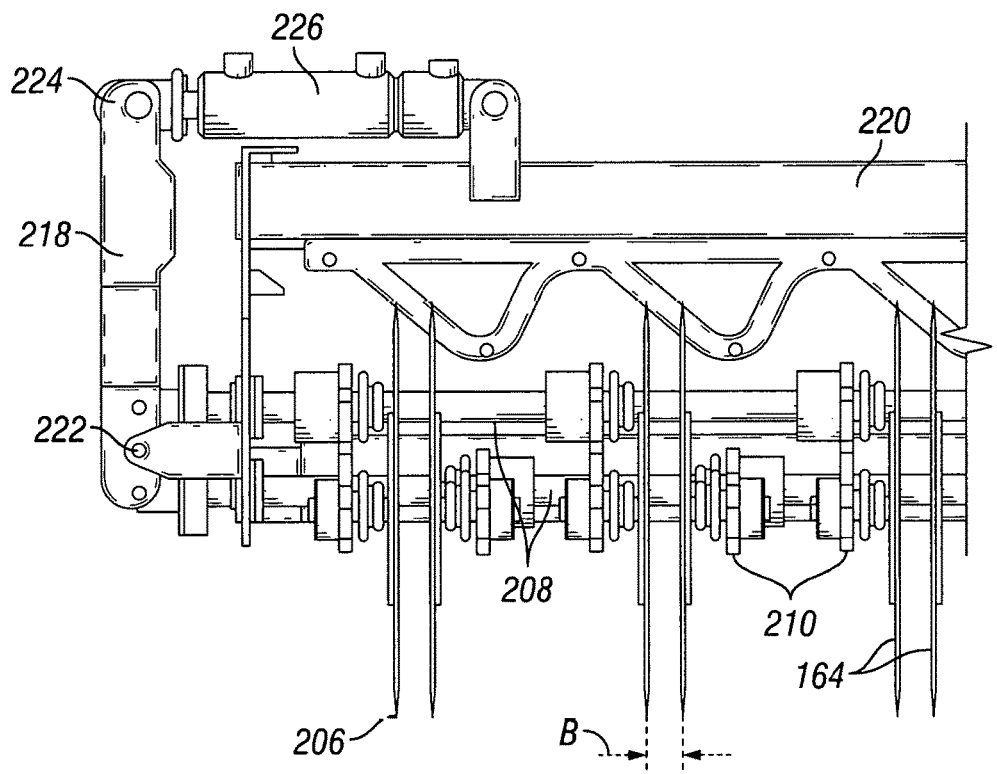
FIG. 14
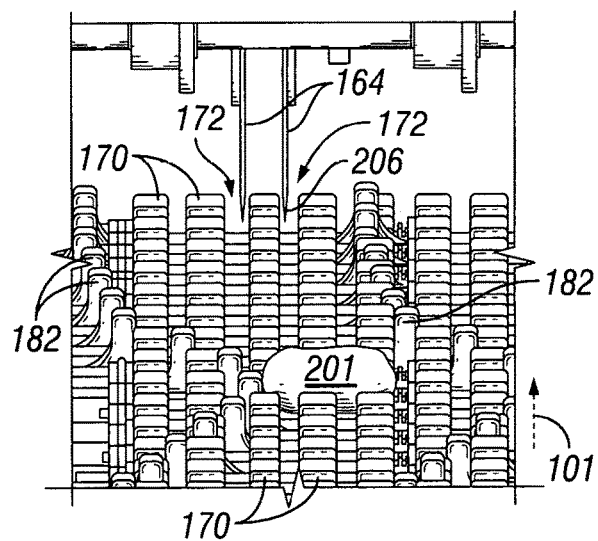 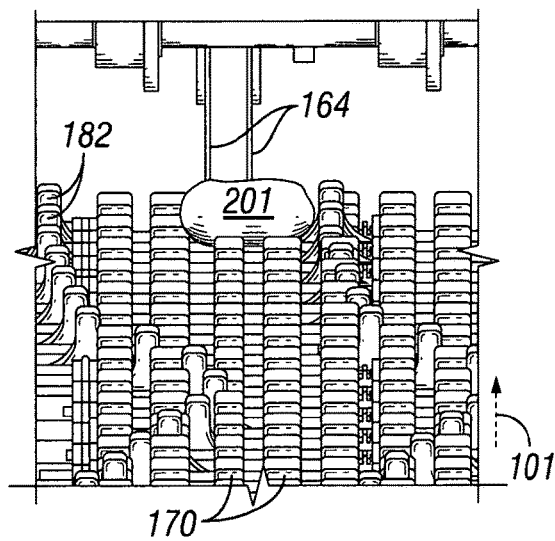
FIG. 15A  FIG. 15B

SEED POTATO CUTTING SYSTEM WITH BLADE POSITIONING MECHANISM

CROSS REFERENCE TO RELATED APPLICATION

The subject matter of the present application is related to U.S. patent application Ser. No. 15/407,190, filed on the concurrent date as the present application, entitled SEED POTATO CUTTING SYSTEM WITH POTATO POSITIONING MECHANISM.

BACKGROUND

Field

The present application relates generally to automated systems for cutting vegetables, such as seed potatoes. More particularly, the present application relates to a seed potato cutting system with a mechanism for simultaneously laterally shifting multiple pairs of cutting blades for cutting the seed potatoes.

Related Art

Potatoes are planted from seed potatoes, which are cut into chunks (e.g. about 2" wide) and planted in the ground. It is desirable that each seed potato chunk have at least two "eyes" from which buds will sprout, forming the new potato plant. In some cases the potatoes are first warmed for a few days in order to induce or spur the growth of the sprouting buds, before they are cut and planted. In other cases, especially in the USA, the seed potatoes are taken directly from cold storage, cut, and then planted in the ground, sometimes all in the same day.

It will be appreciated that high intensity potato cultivation involves the cutting of a large number of seed potatoes. There are a variety of systems and devices that have been developed for the high volume and rapid cutting of seed potatoes for large potato production operations. In prior automated seed potato cutting systems, the seed potatoes are typically randomly positioned on a table, which randomly discharges the seed potatoes onto a roller belt, which moves the potatoes past a group of upright blades. The blades cut the potatoes into pieces for planting.

Unfortunately, this type of system does not optimize the cutting. The upright blades are typically positioned at some uniform spacing, so that all seed potatoes that pass through the blades are cut to the same extent. This approach produces significant waste because the positions of the potatoes relative to the blades are random, so that some cut potato chunks may be much smaller than desired, or have no buds, while others are larger than desired, and are not divided as efficiently as possible, thus wasting seed and also reducing the possible crop yield per seed potato.

The present application is directed to one or more of the above issues.

SUMMARY

It has been recognized that it would be advantageous to have a seed potato cutting system that optimizes the cutting for greater crop yield.

It has also been recognized that it would be advantageous to have a seed potato cutting system that simultaneously adjusts the spacing of multiple pairs of cutting blades prior to cutting, so as to obtain seed pieces of a desired size.

In accordance with one embodiment thereof, the present application provides a seed potato cutting system, including a cutting roller unit with an endless roller chain. The endless roller chain has a plurality of parallel roller sets, each roller set including a plurality of cylindrical rollers on a common axle, with lateral gaps between adjacent rollers, configured to convey seed potatoes toward a distal end of the roller chain. A plurality of pairs of parallel upright blades are disposed at the distal end, the blades having common rotational axes and a cutting edge that passes within a lateral gap between rollers, each pair of blades having a common adjustable blade gap therebetween In accordance with another aspect thereof, the application provides a seed potato cutting system, including a seed potato sizing mechanism, configured to segregate uncut seed potatoes into a plurality of size groups, and a plurality of cutting roller units, positioned to receive a single one of the plurality of size groups of potatoes from seed potato sizing mechanism. Each of the cutting roller units include an endless roller chain, having a plurality of parallel roller sets, each roller set including a plurality of cylindrical rollers on a common axle, with lateral gaps between adjacent rollers configured to convey seed potatoes toward a distal end of the roller chain. A plurality of pairs of parallel upright blades are disposed at the distal end, the blades having common rotational axes and a cutting edge that passes within a lateral gap between rollers, each pair of blades having a common adjustable blade gap therebetween. A blade shifting mechanism is configured to simultaneously laterally shift the blades of each pair in opposing directions, thereby simultaneously changing the blade gap between the blades in each pair of blades.

In accordance with yet another aspect thereof, the application provides a seed potato cutting system, including a seed potato sizing mechanism, configured to segregate uncut seed potatoes into a plurality of size groups, and a plurality of cutting roller units, positioned to receive a single one of the plurality of size groups of potatoes from seed potato sizing mechanism. Each of the cutting roller units include an endless roller chain, configured to convey seed potatoes toward a distal end thereof, and a plurality of pairs of parallel upright blades, disposed at the distal end, the blades having common rotational axes, each pair of blades having an adjustable blade gap therebetween. A blade shilling mechanism is provided, including first and second blade supports, a first blade of each pair of blades being attached to the first blade support, and a second blade of each pair of blades being attached to the second blade support. A pivoting member is coupled to the first and second blade supports, configured to simultaneously translate the first and second blade supports in opposite directions, thereby simultaneously changing the blade gap between all blades in each pair of blades.

BRIEF DESCRIPTION OF THE DRAWINGS

Additional features and advantages of the disclosure will be apparent from the detailed description which follows, taken in conjunction with the accompanying drawings, which together illustrate, by way of example, features thereof, and wherein:

FIG. 3 is a perspective view of the sizing table of the seed potato cutting system of FIG. 1;

FIG. 4 is a close-up perspective view of a portion of the sizing table of FIG. 3, showing the scissor mechanism for adjusting the spacing of the rollers in each sizing roller set;

FIG. 14 is a partial side view of the cutting wheel assembly of FIG. 13, showing the operation of the cutting adjustment mechanism;

FIG. 15A is a detail view showing a portion of a cutting roller and cutting wheel assembly, with a single seed potato being initially aligned relative to the cutting wheels by the thumb rake;

FIG. 15B is a detail view like FIG. 15A, showing the single seed potato being finally aligned relative to the cutting wheels by the thumb rake;

DETAILED DESCRIPTION

Figure 1:
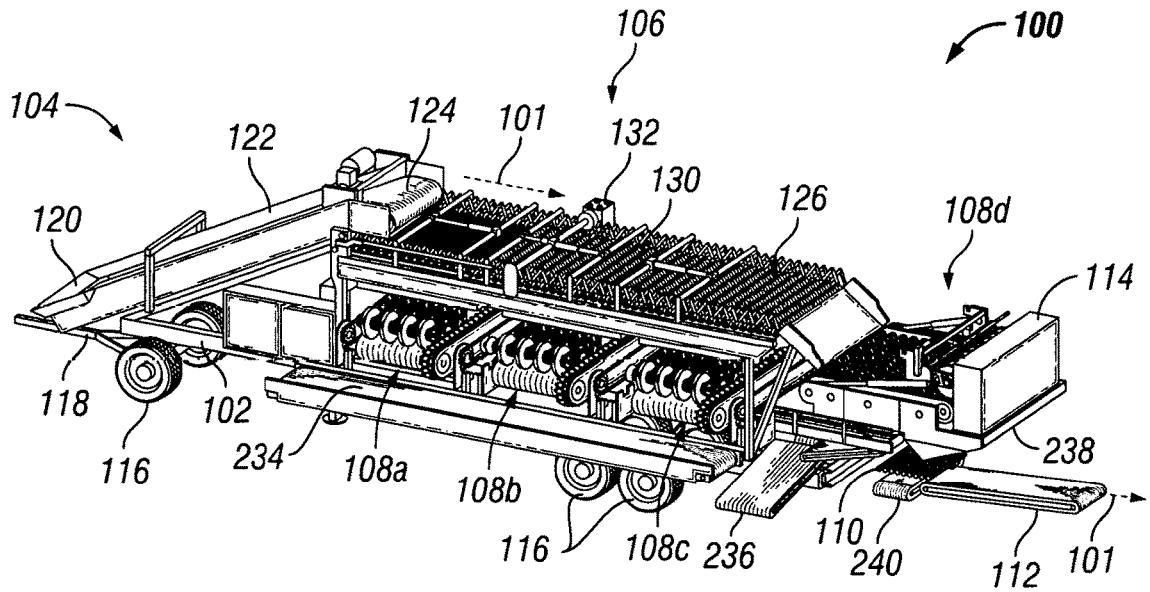
FIG. 1 is a perspective view of an embodiment of a seed potato cutting system in accordance with the present disclosure.

Reference will now be made to exemplary embodiments illustrated in the drawings, and specific language will be used herein to describe the same. It will nevertheless be understood that no limitation of the scope of the disclosed system is thereby intended. Alterations and further modifications of the inventive features illustrated herein, and additional applications of the principles thereof as illustrated herein, which would occur to one skilled in the relevant art and having possession of this disclosure, are to be considered within the scope of the disclosure.

Figure 2:
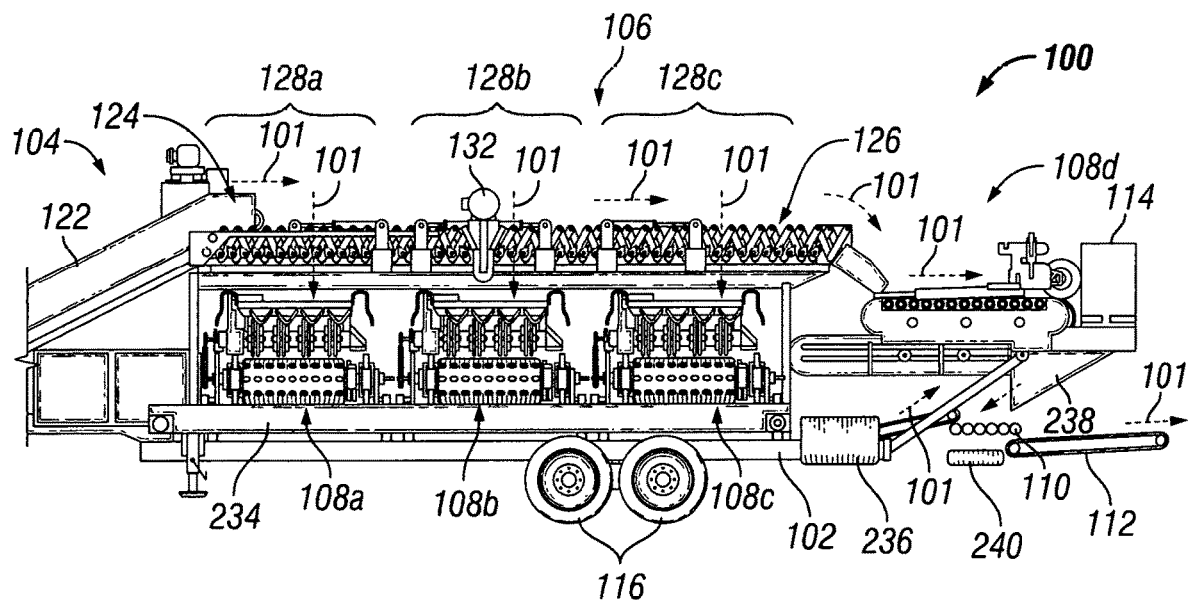
FIG. 2 is a side view of the seed potato cutting system of FIG. 1.

As noted above, the present application relates to a seed potato cutting system that helps to optimize cutting of seed potatoes. Shown in FIGS. 1 and 2 are perspective and side views of an embodiment of a seed potato cutting system, indicated generally at 100, in accordance with the present disclosure. The seed potato cutting system 100 generally includes a frame 102, on which are mounted a seed potato feeding system 104, a seed potato sizing system 106, a plurality of seed potato cutting units, indicated generally at 108, which cut the seed potatoes vertically, a scrap segregation unit 110, and a discharge conveyor 112 for conveying the cut seed potatoes to a receptacle, such as a seed potato bin or the like (not shown). The seed potato cutting system 100 can also include a horizontal cutting unit 114, for horizontally cutting the largest potato pieces, if desired. Throughout the figures, arrows 101 are provided to indicate the feed direction of potatoes and potato pieces through the cutting system 100 and its various parts. In operation, this system 100 receives uncut seed potatoes through the potato feeding system 104, and while transporting them in the feed direction 101 sorts them by size, aligns them for cutting, and runs the whole seed potatoes through pairs of upright, width-adjustable, disc-style cutting blades. After cutting, the system 100 eliminates unusable scraps and 'chips' and conveys the cut seed pieces to an exit point via the discharge conveyor 112.

The frame 102 can include wheels 116 and a hitch 118 at the forward end of the frame, for allowing the seed potato cutting system 100 to be towed on roadways behind a towing vehicle, such as a truck, tractor, or the like (not shown). It, is to be appreciated, however, that this embodiment of the seed potato cutting system 100 is configured to be stationary when in operation. Additional frame elements, motors, conveyors, etc. are also included for transporting the cut and uncut seed potatoes to desired locations, as described in more detail below.

The seed potato feeding system 104 can be an electrically powered elevator unit, configured to receive uncut seed potatoes in a hopper 120 at a point of entry, and raise them via a conveyor belt 122 to a feeding system outlet 124, which is also the inlet location for the seed potato sizing system 106. The elevator 104 can have a variable speed, and the speed can be controllable by a user from a controller device, such as a touch-screen computer controller.

Referring to FIGS. 3-5B, the potato sizing system 106 is configured to segregate seed potatoes into a plurality of size groups, and discharge each size group to a unique cutting roller unit (described in more detail below). The potato sizing system 106 is positioned to receive uncut potatoes discharged from the potato feeding system 104, and generally includes a sorting/sizing table 126 having a plurality of groups, indicated generally at 128, of power driven, parallel sizing rollers 130 disposed in series. In the embodiment depicted in the figures there are three groups 128 of sizing rollers 130, the groups being designated 128a-c. It is to be understood, however, that any number of groups 128 of sizing rollers can be used in this sort of system.

The rollers 130 of all of the roller groups 128 are adapted to convey uncut seed potatoes in a common feed direction, and are driven at a constant speed in the common feed direction by one or more drive motors 132. Each roller 130 includes a roller shaft having a sprocket 134 at one lateral end of the shaft. The drive motors 132 are connected to all of the sprockets 134 rollers by one or more drive chains 136. As shown in FIG. 3, each of the two depicted drive motors 132 have unique drive chains 136 that are disposed on opposite lateral sides of the sizing table 126, each drive motor driving approximately half of the sizing rollers 130. The motors 132 can be electric motors, and their speed can be adjustable from a controller, such as a computer controller with a touch screen interface. Tensioning systems and other devices that may be desirable for the operation of this chain drive system can also be included.

Each group 128 of rollers 130 have a discrete and adjustable longitudinal spacing, indicated generally at S in FIGS. 3 and 4, between adjacent rollers 130, allowing whole seed potatoes to drop between adjacent sizing rollers 130, as indicated by the downward arrows 101 in FIG. 2. More specifically, the longitudinal spacing S of each group 128 of sizing rollers 130 is greater than the longitudinal spacing of rollers a preceding group, whereby seed potatoes sequentially drop between adjacent sizing rollers in order of increasing size. Thus, roller group 128a has the smallest spacing $S_1$ between adjacent sizing rollers 130, group 128b has a larger spacing $S_2$, and group 128c has the largest spacing $S_3$ of the three sizing roller groups 128.

The seed potato sizing mechanism 100 thus includes one or more sets 128 of rotationally driven parallel rollers 130 with longitudinal spaces S between them the first set 128a being spaced at a first spacing $S_1$, so that seed potatoes that are smaller than the first spacing $S_1$ drop between adjacent rollers 130 of the first group 128a, and larger potatoes are passed forward along the sizing table 126 in the feed direction. The second set 128b of rollers 130 has a second larger spacing $S_2$, so that seed potatoes that are conveyed to the second group 128b and are smaller than the second spacing $S_2$ drop between the adjacent rollers 130 of the second group, while larger seed potatoes continue on. Finally, the third set 128c of sizing rollers 130 receive the largest seed potatoes that from the second set 128b rollers, the third rollers being spaced at a third spacing $S_3$ that is larger than the second spacing $S_2$, whereby seed potatoes that are larger than the second $S_2$ spacing and smaller than the third spacing $S_3$ drop between adjacent second rollers in the third group 128c.

Figure 5A:
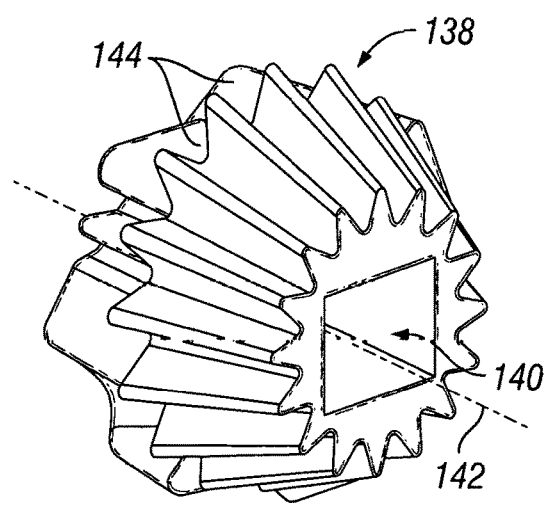
FIG. 5A is a perspective view of an acorn roller that can be used in a first portion of the sizing table of FIG. 3.

In the embodiment depicted herein, the rollers 130 in the first group 128a are specially adapted to convey smaller potatoes. These can be what are commonly termed "acorn rollers," an example of which is shown in FIG. 5A. The acorn rollers 138 have a square shaped central aperture 140 for mounting on a square shaped roller shaft that will rotate about the respective sizing roller shaft axis, indicated generally at 142. As shown in FIG. 5A, the acorn rollers 138 can have a double-tapered shape, and include a plurality of radial fins 144, which are configured for gently engaging and transporting the seed potatoes. The acorn roller 138 can be made of a relatively soft, resilient rubber material or the like, in order to minimize damage to the seed potatoes.

Figure 5B:
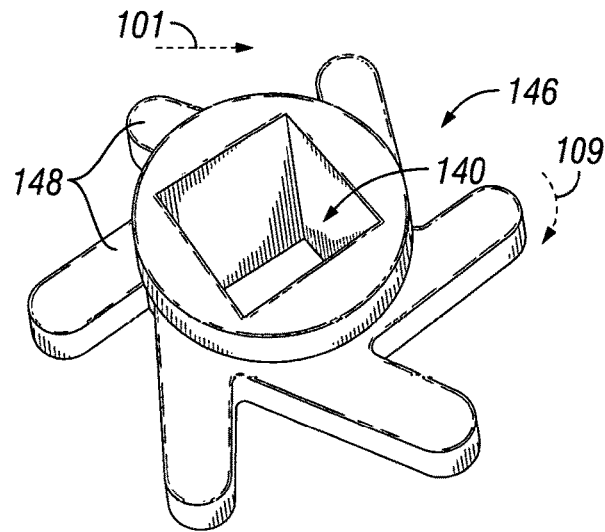
FIG. 5B is a perspective view of a finger roller that can be used in a second portion of the sizing table of FIG. 3.

As shown in FIG. 5B, the rollers 130 in the second and third groups 128b, 128c can be what are commonly called "finger rollers," and are specially adapted and configured for gently engaging and conveying larger seed potatoes. Like the acorn rollers 138, the finger rollers 146 have a square shaped central aperture 140 for mounting on a square shaped roller shaft that will rotate about the respective sizing roller shaft axis, indicated generally at 142. As shown in FIG. 5B, the finger rollers 146 have a plurality of angled fingers 148, which are angled or tapered in a direction opposite to the common teed direction, indicated at 150, relative to the rotational direction 152 of the respective finger roller 146. The fingers 148 of finger rollers 146 of adjacent rollers 130 can be laterally interleaved, so that the fingers 148 of longitudinally adjacent finger rollers 146 do not contact and interfere with each other. The finger rollers 146 can be made of a relatively soft, resilient rubber material or the like, in order to minimize damage to the seed potatoes.

The range of variation of the spaces S between the sizing rollers 130 in each group 128 can vary. In one embodiment, the spacing $S_1$ of the first group 128a is adjustable between 4.25 and 5 inches, whereas the second and third groups' roller spacings $S_2$ and $S_3$ are adjustable between 4 and 5 inches. Other spacing ranges can also be used.

In the embodiment shown herein, adjustment of the sizing roller spacing S is accomplished with a scissor-style linkage, indicated generally at 153, and shown most clearly in FIGS. 3 and 4. The scissor-style linkage 153 includes an elongate series of hingedly-connected scissor arms 154 on both sides of the sizing table 126, upon which the axles of all of the sizing rollers 130 are rotationally supported. For each group 128 of rollers 130, a pair of transverse cross bars 156 are attached to opposing upper pivot points of the opposing scissor linkages, and a longitudinal actuator 158 (e.g. a hydraulic actuator) is connected between each pair of cross bars 156. The adjustable scissor mechanisms are independently adjustable for each sizing roller group 128. That is, the scissor mechanism 153 for the first group 128a provides a first adjustable scissor mechanism, supporting the first group 128a of sizing rollers 130, and also provides a second adjustable scissor mechanism that supports the second group 128b of sizing rollers 130, and so on. Adjustment of the various scissor mechanisms 153 allows selective adjustment of the respective spacing S of the sizing rollers 130. As a given actuator 158 extends, the distance between the sizing rollers 130 in a particular group 128 increases. As that actuator 158 retracts, the distance between the rollers 130 in the respective group 128 decreases. Each of the three sizing table roller groups 128 employs the same method for gap adjustment.

The sizing rollers 130 and drive motors 132 are supported on both sides of the sizing table 126 by rollers and rollable supports 160 that are positioned at various longitudinal locations along a sizing table track 162, which allows the free extension and retraction of the sizing roller groups 128 in the manner just described. This is desirable because the overall length of the sizing table 126 will change with extension or retraction of any of the actuators 158. Extension or retraction of the sizing table actuators 158 can be controlled by a user via a controller, such as a touch-screen computer controller, for example.

Figure 6:
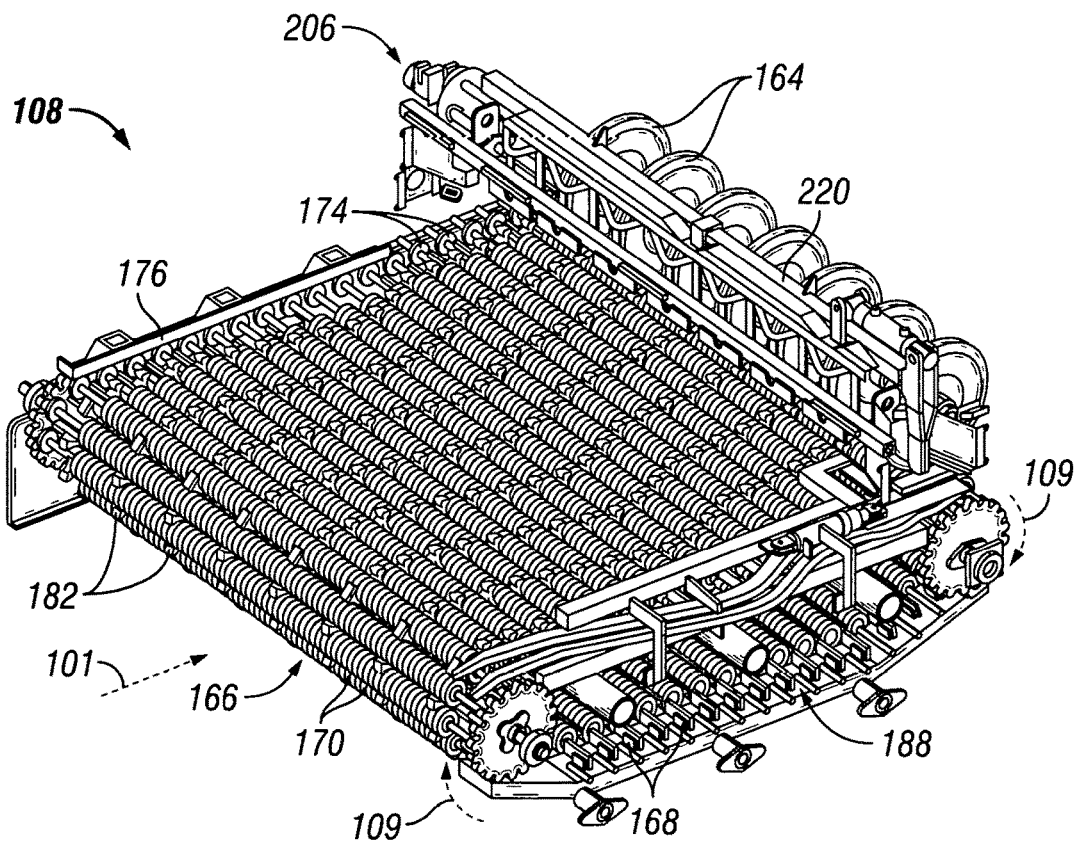
FIG. 6 is a perspective view of a cutting roller unit and cutting blade assembly.
Figure 7:
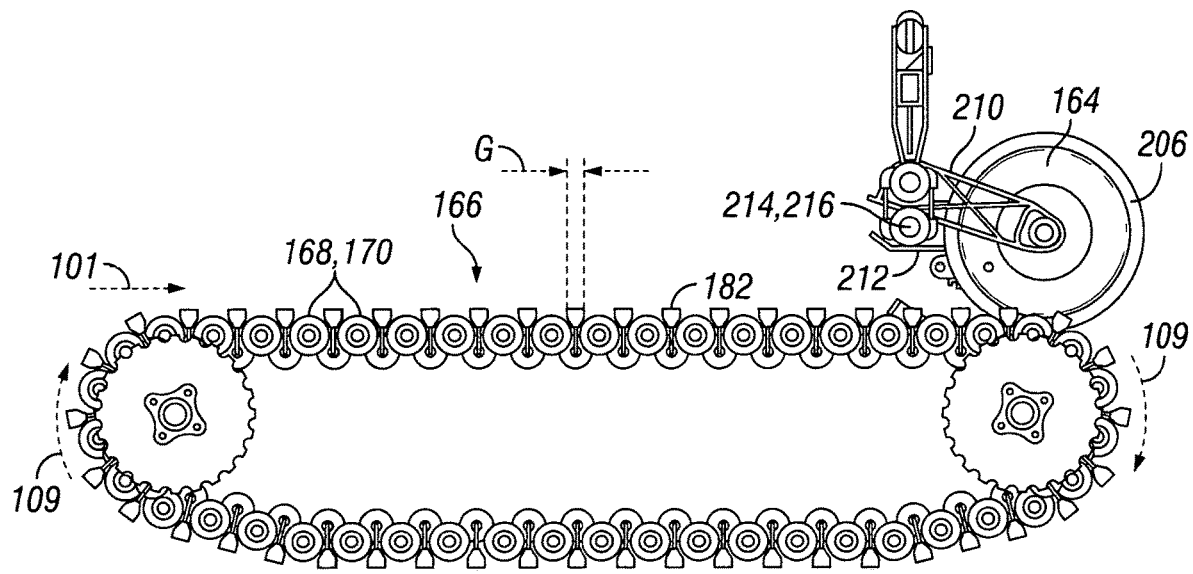
FIG. 7 is a side view of the cutting roller unit of FIG. 6.
Figure 8:
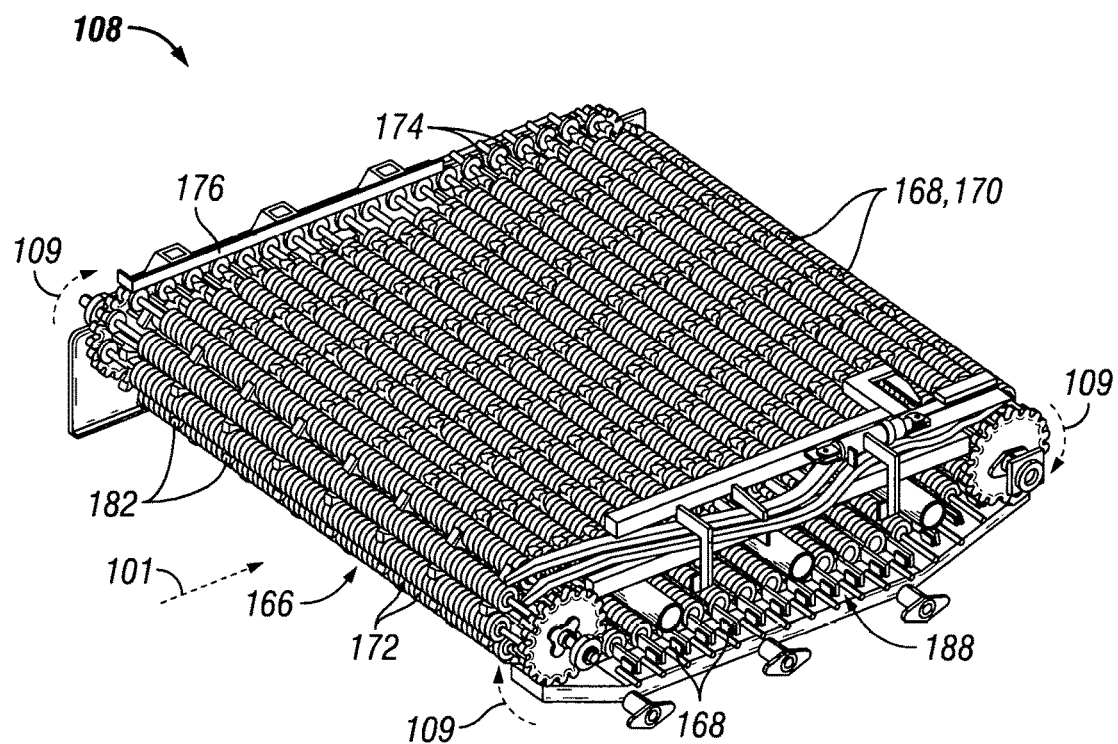
FIG. 8 is a perspective view of the cutting roller unit of FIG. 6, with the cutting blade assembly removed.

Disposed adjacent to the seed potato sizing mechanism 106 are a plurality of cutting roller units, generally designated at 108, and shown in detail in FIGS. 6-8. Each cutting roller unit 108 is configured to receive a discrete size group of uncut seed potatoes from the sizing mechanism 106, and transport the uncut potatoes in the feed direction 101 from their point of entry to a set of cutting knives or blades 164 (shown most clearly in FIGS. 13-15B). Any desired number of cutting roller units 108 can be used. As shown in FIGS. 1-2, in the embodiment illustrated herein there are three cutting roller units 108a-c positioned below and oriented generally transverse to the sizing mechanism 106, and one additional cutting roller unit 108d disposed at a distal end 127 of the sizing table 126.

Referring again to FIGS. 6-8, each cutting roller unit 108 includes an endless roller chain 166, having a plurality of parallel sets 168 of rollers 170. The roller chain is mounted on drive wheels or sprockets that turn in the direction of arrows 109, to drive the top portion of the roller chain 166 in the feed direction 101. The cutting roller chain 166 can be powered by an electric motor, rotary hydraulic actuator, or any other suitable driving device. The roller sets 168 have longitudinal gaps, indicated at G, between adjacent roller sets 168. The roller chain 166 is configured to convey seed potatoes resting in the gaps G in the longitudinal feed direction 101 through the pairs of upright cutting blades 164. It is to be understood that, for the cutting roller units 108a-c that are positioned transversely below the sizing mechanism 106 (as shown in FIGS. 1-2), the longitudinal feed direction 101 for the cutting roller chain 166 will be generally perpendicular to the longitudinal feed direction 101 of the sizing mechanism 106.

The roller sets 168 include a linear series of cylindrical rollers 170 disposed on a common shaft or axle that has a smaller diameter than the rollers. In each roller set 168 there are lateral gaps 172 between adjacent rollers 170, best seen in FIGS. 15A-B. These gaps 172 are configured to allow passage of the cutting blades 164, and to allow lateral shifting of the alignment of each blade 164, as discussed in more detail below. In one embodiment, the gaps 172 where blades 164 pass is about ⅜" wide (0.375"), to allow shifting of the blade positions. Other gap sizes can also be used, and the tolerance for the gap size is relatively large (e.g. ±¹⁄₁₆"), given the typical level of precision involved in cutting seed potatoes. However, it is desirable that the blades 164 not contact the rollers 170 in any of the shifted positions of a given blade 164.

Disposed at one lateral end of the axle or shaft of each cutting roller set 168 is a sprocket or gear 174, which is configured to engage with a grab chain or pinion 176 that is located alongside a proximal portion of the cutting roller chain 166. As the cutting roller chain 166 travels in the feed direction 101, the top of each sprocket or gear 174 of each roller set 168 will engage the grab chain or pinion 176, causing each of the cutting roller sets 168 to rotate backwards (i.e. with its top surface moving counter to the feed direction 101) within the proximal portion of the cutting roller unit 108.

Uncut potatoes (201 in FIGS. 15A-B) that drop onto or are otherwise placed upon the cutting roller chain 166 will naturally come to rest in the longitudinal gaps G between the adjacent cutting roller sets 168 because that is a lower and more stable position than being atop the rollers. Then, the backward rotation of the cutting rollers 166 in the proximal portion rolls the uncut potatoes that are in the gaps G, and causes the long axis of the uncut potatoes to align with the axis of the cutting rollers 166, thus orienting the uncut potatoes generally transverse to the cutting blades 164, which is desired for cutting. After the sprockets 174 emerge from contact with the grab chain 176, the cutting roller sets 168 will cease their backward rotation for the distal portion of the cutting roller chain 166, where the seed potatoes will come into contact with the cutting blades 164. There is no individual rotation of the cutting rollers 168 after contact with the grab chain 176. The geometry of the cutting roller chain 166 and the backward rotation of the roller sets 168 thus help orient the seed potatoes for cutting.

Figure 9:
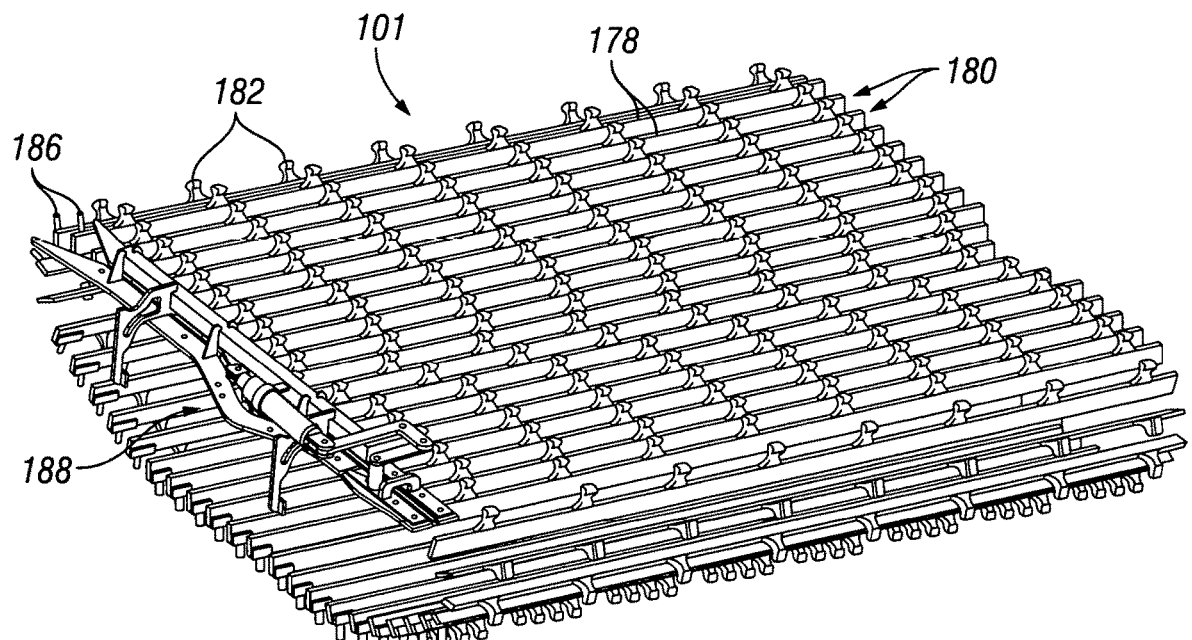
FIG. 9 is a perspective view showing the thumb rake chain portion of the cutting roller unit of FIG. 6.
Figure 11:
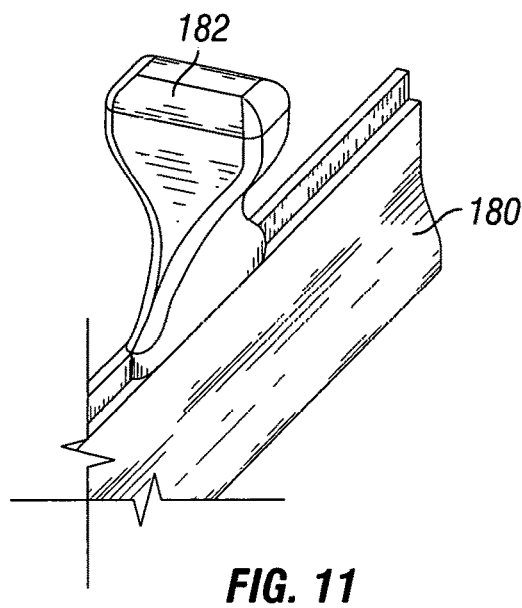
FIG. 11 is a close-up perspective view of a portion of a thumb rake bar, showing a single thumb.
Figure 12:
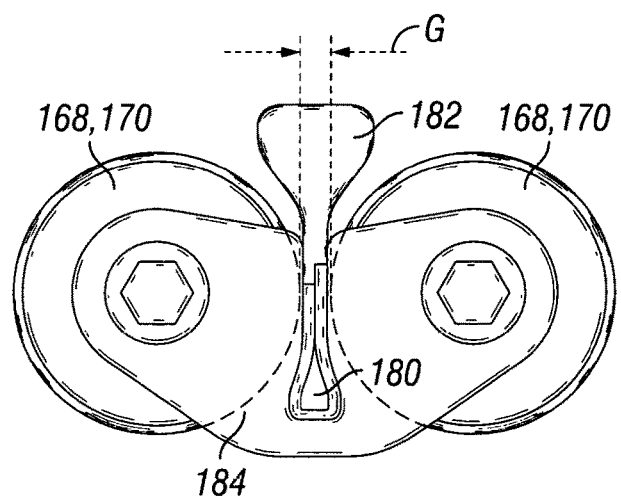
FIG. 12 is a close-up side view of a thumb rake attachment link.

Advantageously, the cutting roller unit 108 also includes a mechanism for laterally aligning the seed potatoes for more optimal cutting. Incorporated into the cutting roller chain 166 are a series of laterally-slidable thumb rakes 178. The thumb rakes 178 occupy each of the longitudinal gaps G between adjacent cutting roller sets 168. As best seen in FIGS. 9 and 11-12, the thumb rakes 178 generally include a rake body 180, with a plurality of thumbs 182 (e.g. 8 thumbs 182 on each rake 178) upwardly extending from the rake body 180. The thumbs 182 can be of a resilient rubber material to ensure a firm, but gentle shift of uncut seed potatoes. As shown in FIG. 11, the thumbs 182 have a flared shape that fits between the adjacent roller sets 168, and the rake body 180 is slidably supported in a slot in a rake support plate 184 that is connected between axles of adjacent roller sets 168, as shown in FIG. 12.

The thumb rakes 178 thus move in the same direction and with the same speed as the cutting roller chain 166, but can laterally slide between the roller sets 168 independently of movement of the roller chain 166. Advantageously, the uncut seed potatoes do not ride on the thumb rakes 178, but ride on the cutting rollers 168 in the gaps G. The thumbs 182 are designed to contact and laterally slide the uncut seed potatoes that are disposed in the gaps G, in order to laterally align the uncut potatoes with the cutting blades 164.

Figure 10:
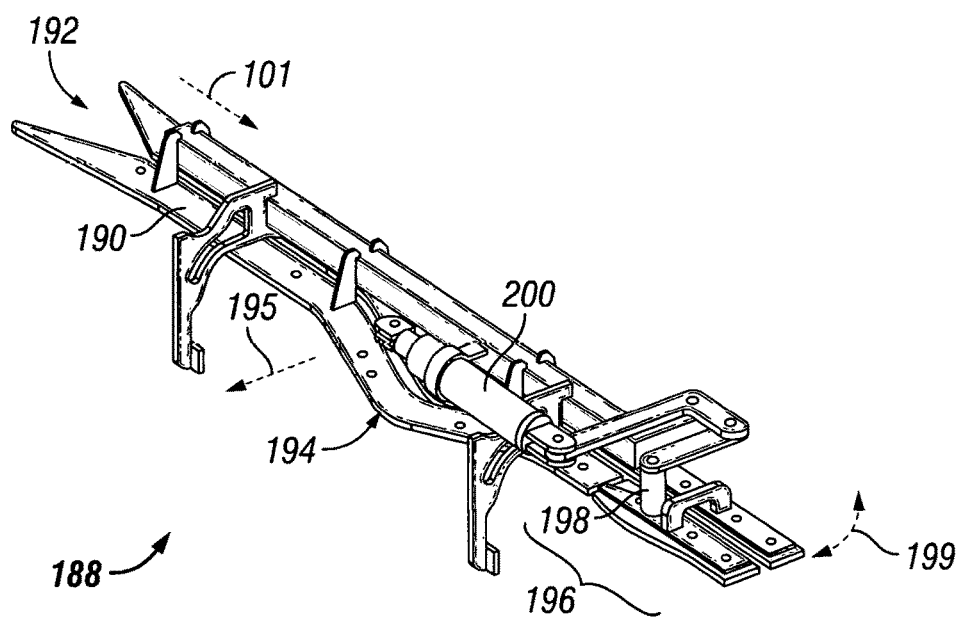
FIG. 10 is a perspective view of the thumb rake alignment track of the cutting roller unit of FIG. 6.

Lateral sliding of the thumb rakes 178 can be accomplished in several ways. In the embodiment shown herein, each thumb rake 178 includes an alignment pin 186 that extends upwardly from a lateral end of the rake body 180, and is configured to contact a thumb rake alignment device 188 that is positioned alongside an upper portion of the cutting roller chain 166, as best seen in FIGS. 9 and 10. The thumb rake alignment device 188 includes a guide track 190 having a pair of guides, each alignment pin traveling between the guides of the guide track as the roller chain 166 travels in the longitudinal direction, to shift and align the thumb rakes 178 as the cutting roller chain 166 moves progressively forward.

More particularly, the thumb rake guide track 190 includes a V-shaped entrance 192, which provides a gradual entrance for the alignment pins 186 and allows for easy acquisition of each entering pin. Following the entrance region 192, where the guide track 190 keeps the alignment pins in a neutral position, the guide track 190 includes a fixed diverted portion 194 that laterally shifts away from and back to the neutral position (i.e. away from and back toward the adjacent lateral side of the cutting roller chain 166). This fixed diverted portion 194 slides all thumb rakes a fixed distance in a first direction, indicated by arrow 195, and then back to their original alignment (the neutral position). This movement is designed to provide a first shift of the uncut seed potatoes that is an over-compensating shift, sliding all uncut seed potatoes, regardless of their size, a fixed distance toward the edge of the cutting roller chain 166 on the side of the alignment device 188. Advantageously, because the thumb rakes 178 shift independently of motion of the cutting rollers 168, they are able to shift back and forth without causing shifted uncut potatoes back into the position that they were in before they shifted as the track returns to its straight, linear path following the fixed diverted portion 194.

The thumb rake alignment device 188 also includes an adjustable distal portion 196, which is configured to contact each alignment pin 186 (subsequent to contact with the fixed diverted portion 194), and laterally slide all thumb rakes 178 a selectable distance in a second direction (opposite to the first direction). This movement provides a second lateral shift of the seed potatoes by a distance that can be specifically selected based on the size of potatoes that are placed on a given cutting roller unit 108.

The adjustable distal portion 196 can include a hinge 198, disposed toward a distal portion of the guide track 190, with an actuator 200, such as a hydraulic or pneumatic ram, attached to the portion beyond the hinge. This allows the distal portion 196 of the guide track 190 to be selectively deflected toward the adjacent lateral edge of the cutting roller chain 166 (as indicated by arrow 199), so that all thumb rakes 178 are pushed back away from the lateral edge by a selected distance. Extension of the actuator 200 causes movement of the distal portion 196 toward the lateral edge, and retraction of the actuator 200 causes the distal portion to move away from the lateral edge, back to its default position, thus allowing fine-tuning of the position in which the seed potatoes enter the cutting knives 164. In one embodiment, the adjustable distal portion 196 is the last 20" of the guide track 190, which is hinged and connected to an actuator 200 in this way, though the length of the adjustable distal portion 196 can vary.

The fixed and selectable distances can vary. In one embodiment, the thumb rake alignment device 188 is configured to shift the thumb rakes a first fixed distance from the neutral position that can be about 6", or more broadly in the range of 4" to 8", depending on the size of the uncut seed potatoes, and a second selectable distance in the opposite direction that is in the range of 0" to 1.5" from the neutral position, as indicated by arrow 199 in FIG. 10. The first and second shifts thus sequentially laterally slide all thumb rakes 178 in first and second directions, respectively, to contact and laterally align each seed potato 201 relative to a corresponding pair of cutting blades 164 as the roller chain 166 conveys the seed potatoes 201 theretoward. The first shift moves the potatoes 201 a fixed distance, which can be a distance that aligns one edge of each uncut seed potato with one of the cutting blades 164, or some other fixed distance. It will be appreciated that the first shift distance that is shown in FIG. 15A moves one end of the uncut seed potato 201 (the left end of the seed potato in FIG. 15A) to a point that is aligned somewhere between the two cutting blades 164, and not necessarily aligned with either one of them. The second shift moves the potato to a desired final position prior to being cut. In the exemplary configuration shown in FIG. 15B, the second shift has pushed to right end of the uncut seed potato 201 the selected adjustable distance back toward the left, so that the uncut potato 201 is positioned to produce two cut pieces that are a specifically desired size (the portion between the blades 164 and the portion to the right of the right hand blade), and a possible third cut piece toward the left that will vary in size depending on the size of the seed potato 201.

These two lateral shifts of the uncut seed potatoes help provide consistent and controllable cut seed potato sizes. The magnitude of these two pre-cut shifts can be selected based on two measurements: (1) the size of the spacing (and thus of the corresponding cut potato piece) between each pair of cutting knives 164 associated with the respective cutting roller unit 108, and (2) the overall size of the uncut potato, which will determine the size of the end pieces that come from an individual potato on the outer side of the pair of cutting knives 164. It is desirable that these two measurements be close to the same. For this reason, the overcompensating shift is made first, and the alignment shift is made afterward. However, with the natural variation in the size of uncut potatoes, this two-step alignment helps to provide at least two cut seed potato pieces of a desired size, and possibly a third, from each seed potato.

Figure 13:
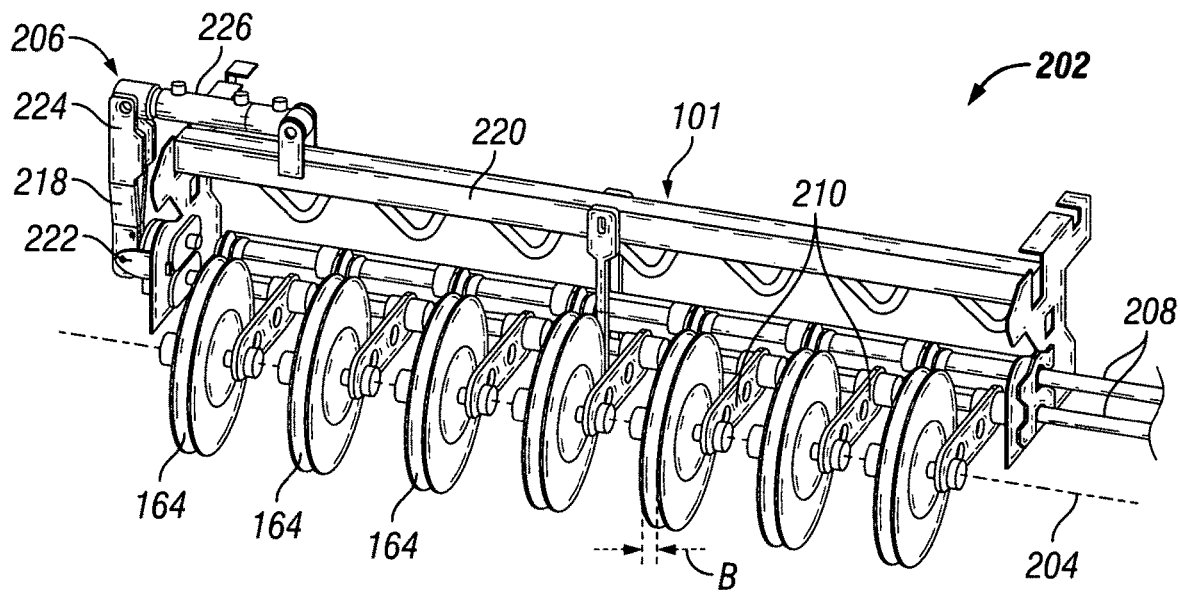
FIG. 13 is a rear perspective view of an adjustable cutting wheel assembly for a cutting roller unit like that of FIG. 6.
Figure 16:
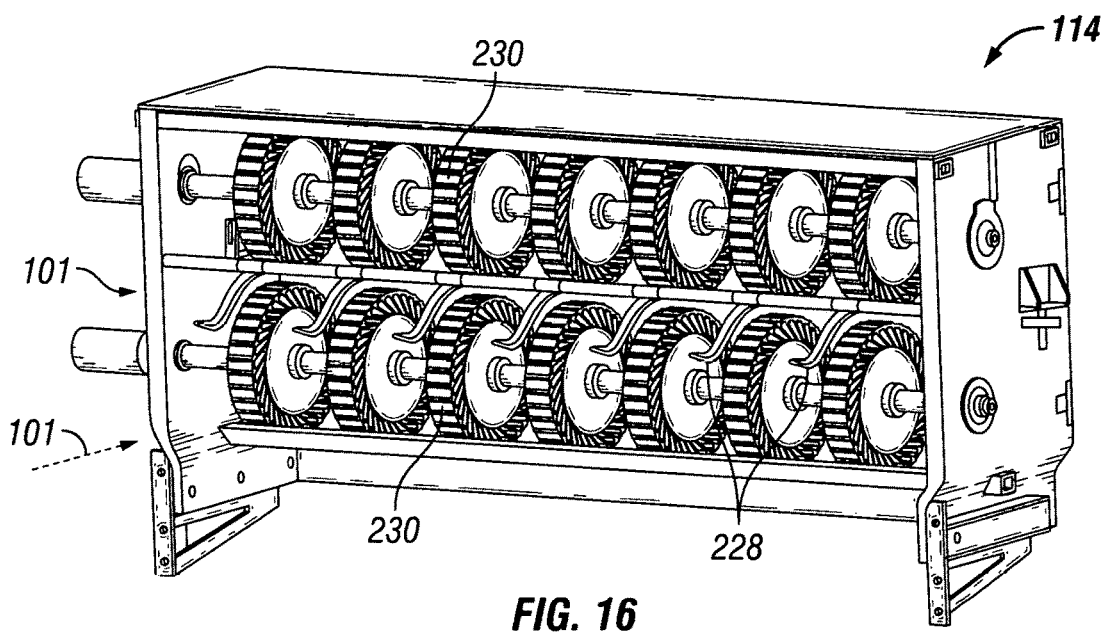
FIG. 16 is a perspective view of a horizontal cutting unit for making a horizontal cut in seed potatoes.
Figure 17:
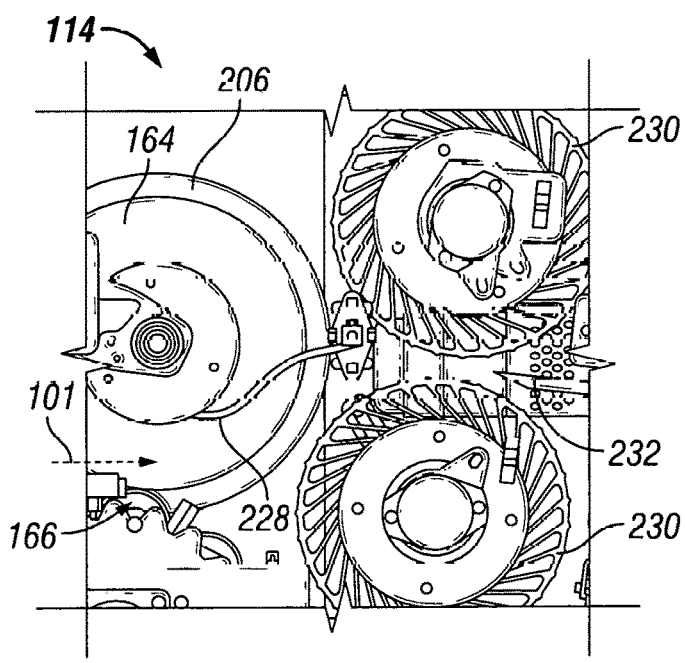
FIG. 17 is a side, cross-sectional view of the horizontal cutting unit of FIG. 16.
Figure 18:
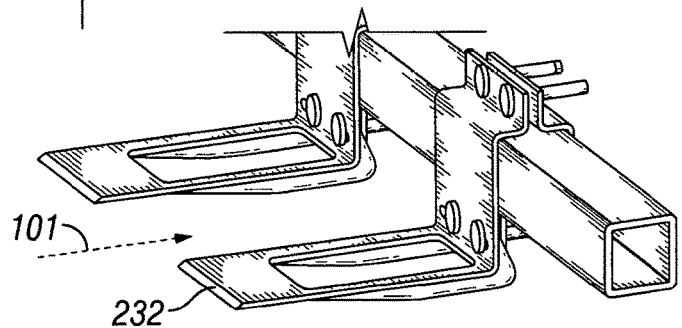
FIG. 18 is a close-up perspective view of a portion of a set of horizontal cutting knives of the horizontal cutting unit of FIG. 16.
Figure 19:
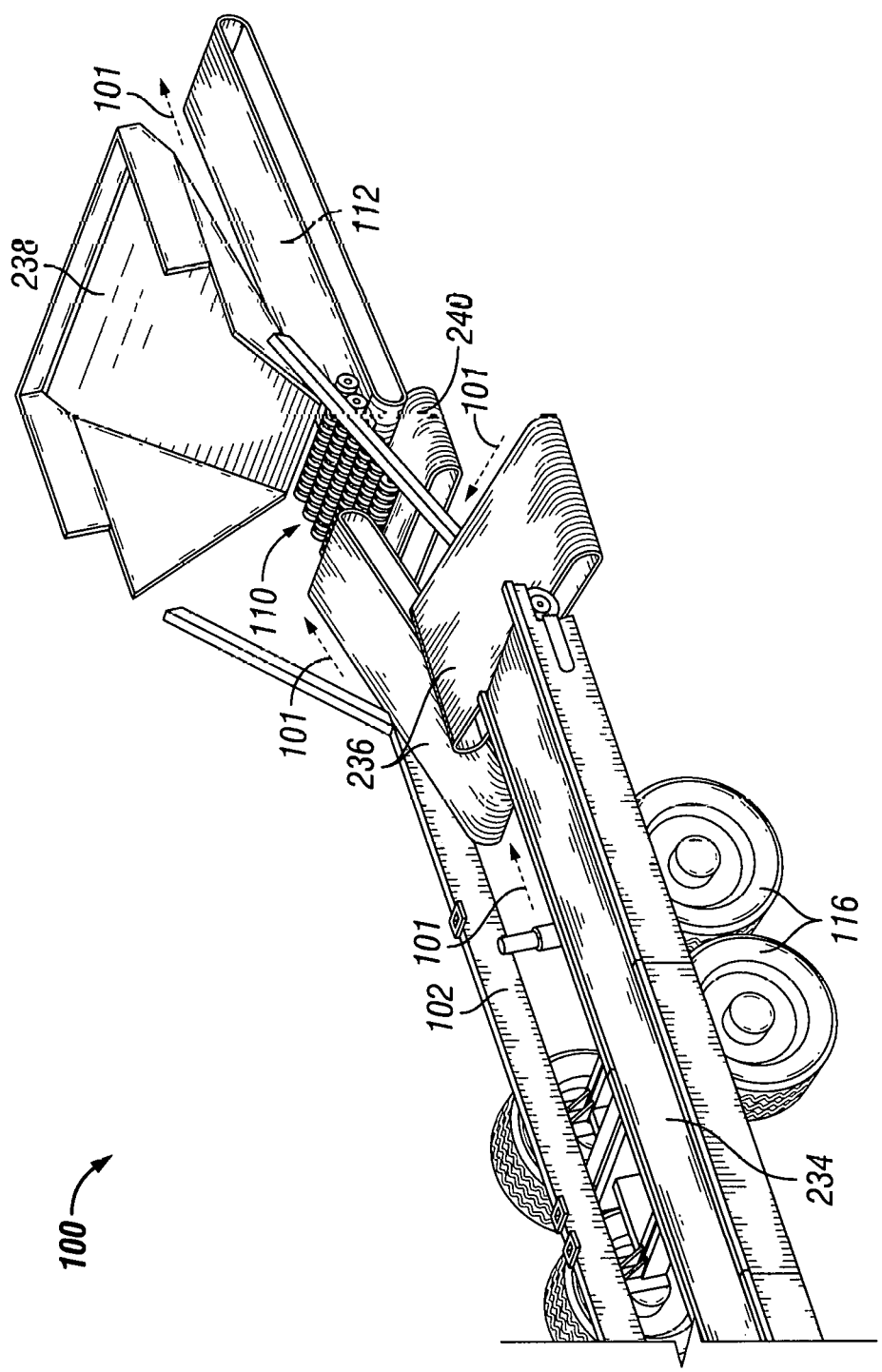
FIG. 19 is a partial perspective view of the conveyor belt portions of the mobile seed potato cutting system, and showing the scrap sizing roller table and outlet conveyor.

After alignment by the shifting thumb rakes 178, the moving cutting roller chain 166 feeds each of the uncut seed potatoes through one of a plurality of pairs of parallel upright disc-style cutting knives or blades 164 that are disposed near the distal end of the cutting roller unit 108. A perspective view of one cutting blade unit 202, configured for use with one cutting roller unit 108, is shown in FIG. 13. A partial rear view of the same is provided in FIG. 14, and partial front views of two pairs of cutting blades 164 are shown in relation to a cutting roller chain 166 in FIGS. 15A-B. All of the blades 164 that are associated with a given cutting roller unit 108 have a common rotational axis, indicated at 204 in FIGS. 13 and 14, and each blade 164 has a cutting edge 206 that passes within a lateral gap 172 between rollers 168, as shown in FIGS. 15A-B.

Each pair of blades 164 in a given cutting blade unit 202 have a common blade gap or blade separation B that is adjustable. That is, the blade gap B is the same for all pairs of blades 164 in a given blade unit 202, but the magnitude of that common separation is adjustable. Each blade unit 202 includes a blade shifting mechanism 206, one embodiment of which is shown in FIGS. 13 and 14. The blade shifting mechanism 206 is configured to simultaneously laterally shift the blades 164 of each pair of blades in opposing directions, thereby simultaneously changing the blade gap or spacing B between the blades in each pair of blades.

In the blade shifting mechanism 206 shown herein, a blade unit frame 220 supports a pair of blade arm supports 208 that are disposed parallel to each other and parallel to the rotational axis 204 of the associated group of cutting blades 164. A plurality of pairs of blade arms 210 are attached to the pair of blade arm supports 208, a first blade arm 210 of each pair of blade arms being attached to one of the blade arm supports 208, and a second blade arm 210 of each pair of blade arms being attached to the other blade arm support 208 of the pair. Each blade 164 is rotationally attached to one of the blade arms 210, and is coupled by a drive chain 212 to a drive shaft 214, which can be connected to a motor 216 or other driving device that powers all of the blades 164 in a given blade unit 202. Additionally, the rotating blades 164 can be mechanically linked to the cutting roller chain 166, so that as the cutting roller speed changes, the rotational speed of the cutting knives 164 can change accordingly.

A pivoting member 218 is pivotally attached to the blade unit frame 220 at a fixed pivot point 222, and pivotally coupled to each of the blade arm supports 208 on opposing sides of the fixed pivot point 222 and equidistant therefrom. A far end 224 of the pivoting member 218 is coupled to an actuator 226, such as a hydraulic actuator or the like. With this configuration, extension or retraction of the actuator 226 moves the pivoting member 218 between first and second extreme positions, and thereby simultaneously translates the blade arm supports 208 in opposite directions, moving all of the blades 164 in each pair toward or away from each other in opposite directions between minimum and maximum blade gap positions.

Viewing FIG. 14 in particular, extension of the actuator 226 causes the top blade arm support 208 to move in the same direction as the actuator 226, since it is mounted above the actuator's linking pivot point 222, thereby increasing the gap B between each knife 164 in each pair. At the same time, extension of the actuator 226 creates an equal and directionally opposite movement of the bottom blade arm support 208, because that blade arm support 208 is located beneath the actuator's linking pivot point 222, thus also increasing the gap B. Retraction of the actuator 226 has the opposite effect on both the top and bottom blade arm supports, thus decreasing the gap B between each knife pair.

This operation of the blade shifting mechanism 206 allows the spacing B of all blades 164 in a given blade unit 202 to be simultaneously and uniformly adjusted. Adjustment of the blade gap B can be mechanically controlled (e.g. via manual adjustment of a valve associated with the actuator) or electronically controlled, such as via a computer controller that is coupled to the actuator 226. Adjustment of the blade gap B can be in discrete increments, or the blade shilling mechanism 206 can allow adjustment to any blade position between the minimum and maximum extremes. In one embodiment, the gap B between each pair of knives is adjustable in increments of 0.1 inch, with a minimum gap of about 1.5 inches and a maximum gap of about 2.5 inches, though other blade spacing ranges can be used.

The cutting roller units 108 described above are configured to make vertical cuts in whole seed potatoes. However, the seed cutting system 100 disclosed herein can also include a horizontal cutting mechanism for providing additional cuts to the largest seed potatoes. As can be seen in FIGS. 1 and 2, located past the distal end 127 of the sizing table 126 is a fourth and last cutting roller unit 108*d*. Seed potatoes that are too large to drop through any of the three sizing roller groups 128*a-c* will naturally be discharged from the distal end 127 of the sizing table 126 to the fourth cutting unit 108*d*, which is configured and operates like the other cutting units 108 described above. Since this last cutting roller unit 108*d* will be receiving and cutting the largest sized potatoes, a horizontal cutting unit 114 is positioned downstream of the last cutting roller unit 108*d*, and is configured to horizontally cut at least some of the seed potato pieces that are discharged from the last cutting roller unit 108*d*.

The horizontal cutting unit 114 includes a group of fingers 228 that extend between the cutting discs 164 of the last cutting roller unit 108*d* and function to dislodge cut potato pieces from between each pair of blades 164 in the last cutting roller unit 108*d*. The fingers 228 direct these vertically cut pieces toward vertically aligned rubber puller wheels 230, which draw in and drive the cut pieces against a horizontal knife 232 that is located behind the rubber puller wheels 230, where the piece is horizontally cut. This is desirable for the largest size potatoes because a single vertical cutting operation, even where three pieces are created, is likely to result in the central piece being larger than is desired. Thus, horizontally cutting that central piece in half helps to optimize the cutting operation to provide a greater proportion of potato seed pieces in the desired size range.

Advantageously, in the seed potato cutting system disclosed herein, none of the uncut seed potatoes are cut twice after being sized by the sizing table 126. The only time an uncut seed potato will cut more than once is when it needs to be horizontally cut because it was too large and passed over the sizing table 126 without being sized.

After cutting, seed potato pieces that are discharged from all of the plurality of cutting roller units 108 are collected and passed through a scrap segregation roller system 110, which separates cut seed potato pieces that are below a minimum size from the rest of the cut potato pieces. The process of cutting seed potatoes into desired sizes for planting will usually result in the production of some scraps and chips that are too small to be used for seed. Because of this, all cut seed pieces will pass over the scrap segregation roller system or scrapping table 110, which operates like the sizing roller system 106 discussed above, but includes sizing rollers of a size and spacing that allow all but the smallest potato pieces to pass over. The scrap segregation roller system 110 separates cut seed potato pieces that are below a minimum size threshold from the rest of the cut potato pieces, to help ensure that these scraps or chips will not be used for seed.

More particularly, after the seed potatoes are cut, pieces from the first three cutting roller units 108*a-c* are discharged to a collection conveyor belt 234. This belt transports these pieces to one or more other conveyor belts 236 that move the cut pieces to the rear of the seed cutting machine 100 and discharge them to the scrap segregation roller unit 110. Similarly, cut pieces that are discharged from the last cutting roller unit 108*d* and the horizontal cutting unit 114 drop through a chute 238 directly to the scrap segregation roller unit HO. The rollers of the scrap segregation roller unit 110 discharge the small potato scraps and chips to a waste conveyor 240, from which they can be discarded, and transports the larger, usable cut potato pieces to a discharge conveyor 112, which transports these pieces to an exit point, such as a receptacle (e.g. a hopper or seed potato truck) for collection and ultimate use in planting.

The disclosure thus provides a seed potato cutting system that sizes the uncut seed potatoes, then aligns and laterally positions them for optimal cutting depending on their size, and cuts the seed potatoes using pairs of vertical cutting blades having a commonly adjustable gap between the blades in each pair. The system can also provide an additional horizontal cutting step for the largest seed potatoes, then separates potato scraps and chips that are too small for use as seed from the rest of the cut potato pieces, and discharges the usable seed pieces from the machine. The system thus individually adjusts the position and orientation of seed potatoes relative to cutting blades prior to cutting, so as to obtain seed pieces of a desired size, and optimizes the cutting based on the seed potato size, for greater crop yield.

It is to be understood that the above-referenced arrangements are illustrative of the application of the principles of the present disclosure. It will be apparent to those of ordinary skill in the art that numerous modifications can be made without departing from the principles and concepts of the disclosure as set forth in the claims.

What is claimed is:

1. A seed potato cutting system, comprising:
   a cutting roller unit, including
      an endless roller chain, having a plurality of parallel roller sets, each roller set including a plurality of cylindrical rollers on a common axle, with lateral gaps between adjacent rollers configured to convey seed potatoes toward a distal end of the roller chain;
      a plurality of discrete pairs of adjacent parallel upright blades, disposed at the distal end, the blades having common rotational axes and each blade having a cutting edge that passes within one of the lateral gaps between rollers, each discrete pair of blades having a common adjustable blade gap between the respective adjacent blades; and
   a blade shifting mechanism, configured to simultaneously laterally shift both blades of each discrete pair of adjacent blades in opposing directions, thereby simultaneously changing the blade gap of all pairs of blades.

2. A seed potato cutting system in accordance with claim 1, wherein the lateral gaps are about ⅜" wide.

3. A seed potato cutting system in accordance with claim 1, wherein the blade gap is adjustable from about 1.5" to about 2.5" wide.

4. A seed potato cutting system in accordance with claim 1, wherein the blade shifting mechanism comprises:
   first and second blade arm supports, disposed parallel to each other and parallel to the rotational axes; and
   a plurality of pairs of blade arms, each blade being rotationally attached to one of the blade arms, a first blade arm of each pair of blade arms being attached to the first blade arm support, and a second blade arm of each pair of blade arms being attached to the second blade arm support; and
   a pivoting member, coupled to the first and second blade arm supports, configured to simultaneously translate the first and second blade arm supports in opposite directions.

5. A seed potato cutting system in accordance with claim 4, further comprising an actuator, coupled to an end of the pivoting member, configured to move the pivoting member between first and second positions, in which the blade gap is at a minimum and a maximum, respectively.

6. A seed potato cutting system in accordance with claim 5, wherein the minimum blade gap is about 1.5" and the maximum blade gap is about 2.5".

7. A seed potato cutting system in accordance with claim 1, further comprising:
a sprocket, disposed at a lateral end of each axle of the roller chain; and
a drag chain, fixedly disposed laterally alongside a proximal portion of the endless roller chain, positioned to engage the sprockets of the roller chain, to induce reverse rotation of the parallel roller sets while the roller chain moves within the proximal portion.

8. A seed potato cutting system in accordance with claim 1, further comprising:
a seed potato sizing mechanism, configured to segregate uncut seed potatoes into a plurality of size groups; and
wherein the cutting roller unit comprises a plurality of cutting roller units, disposed adjacent to the seed potato sizing mechanism, each cutting roller unit configured to receive a discrete size group of uncut seed potatoes from the sizing mechanism.

9. A seed potato cutting system in accordance with claim 8, wherein the seed potato sizing mechanism comprises a sizing table, positioned to receive seed potatoes from the seed potato feeding system, having a plurality of groups of parallel sizing rollers disposed in series, each group being adapted to convey uncut seed potatoes and having a discrete and adjustable longitudinal spacing between adjacent rollers, the longitudinal spacing of each group being greater than the spacing of a preceding group, whereby seed potatoes sequentially drop between adjacent sizing rollers in order of increasing size.

10. A seed potato cutting system in accordance with claim 8, further comprising:
a last one of the plurality of cutting roller units, positioned to receive from the seed potato sizing mechanism seed potatoes that are of a largest size; and
a horizontal cutting unit, configured to horizontally cut seed potato pieces discharged from the last one of the plurality of cutting roller units.

11. A seed potato cutting system in accordance with claim 8, further comprising a scrap segregation roller system, positioned to receive cut potato pieces discharged from all of the plurality of cutting roller units, and to separate cut seed potato pieces that are below a minimum size threshold from a remainder of the cut potato pieces.

12. A seed potato cutting system, comprising:
a seed potato sizing mechanism, configured to segregate uncut seed potatoes into a plurality of size groups;
a plurality of cutting roller units, positioned to receive a single one of the plurality of size groups of potatoes from the seed potato sizing mechanism, each of the cutting roller units including
an endless roller chain, having a plurality of parallel roller sets, each roller set including a plurality of cylindrical rollers on a common axle, with lateral gaps between adjacent rollers configured to convey seed potatoes toward a distal end of the roller chain; and
a plurality of discrete pairs of parallel adjacent upright blades, disposed at the distal end, the blades having common rotational axes and each blade having a cutting edge that passes within one of the lateral gaps between rollers, each discrete pair of blades having a common adjustable blade gap between the respective adjacent blades; and
a blade shifting mechanism, configured to simultaneously laterally shift both blades of each discrete pair of adjacent blades in opposing directions, thereby simultaneously changing the blade gap of all pairs of blades.

13. A seed potato cutting system in accordance with claim 12, wherein the blade shifting mechanism comprises:
first and second blade arm supports, disposed parallel to each other and parallel to the rotational axes;
a plurality of pairs of blade arms, each blade being rotationally attached to one of the blade arms, a first blade arm of each pair of blade arms being attached to the first blade arm support, and a second blade arm of each pair of blade arms being attached to the second blade arm support; and
a pivoting member, coupled to the first and second blade arm supports, configured to simultaneously translate the first and second blade arm supports in opposite directions.

14. A seed potato cutting system in accordance with claim 13, further comprising an actuator, coupled to an end of the pivoting member, configured to move the pivoting member between first and second positions, in which the blade gap is at a minimum and a maximum, respectively.

15. A seed potato cutting system in accordance with claim 12, further comprising:
a last one of the plurality of cutting roller units, positioned to receive from the sizing table seed potatoes that are of a largest size; and
a horizontal cutting unit, configured to horizontally cut seed potato pieces discharged from the last one of the plurality of cutting roller units.

16. A seed potato cutting system in accordance with claim 12, wherein the seed potato sizing mechanism comprises a sizing table, positioned to receive seed potatoes from the seed potato feeding system, having a plurality of groups of parallel sizing rollers disposed in series, each group being adapted to convey uncut seed potatoes and having a discrete and adjustable longitudinal spacing between adjacent rollers, the longitudinal spacing of each group being greater than the spacing of a preceding group, whereby seed potatoes sequentially drop between adjacent sizing rollers in order of increasing size.

17. A seed potato cutting system, comprising:
a seed potato sizing mechanism, configured to segregate uncut seed potatoes into a plurality of size groups;
a plurality of cutting roller units, positioned to receive a single one of the plurality of size groups of potatoes from seed potato sizing mechanism, each of the cutting roller units including
an endless roller chain, configured to convey seed potatoes toward a distal end of the roller chain; and
a plurality of pairs of parallel upright blades, disposed at the distal end, the blades having common rotational axes, each pair of blades having an adjustable blade gap therebetween; and
a blade shifting mechanism, including
first and second blade supports, a first blade of each pair of blades being attached to the first blade support, and a second blade of each pair of blades being attached to the second blade support; and
a pivoting member, coupled to the first and second blade supports, configured to simultaneously translate the first and second blade supports in opposite directions, thereby simultaneously changing the blade gap between all blades in each pair of blades.

18. A seed potato cutting system in accordance with claim 17, further comprising an actuator, coupled to an end of the pivoting member, configured to move the pivoting member between first and second positions, in which the blade gap is at a minimum and a maximum, respectively.

19. A seed potato cutting system in accordance with claim 17, further comprising a horizontal cutting unit, positioned to receive seed potatoes that are of a largest size from a last of the cutting roller units, and to horizontally cut seed potato pieces discharged from the last one of the plurality of cutting roller units.

* * * * *